United States Patent [19]
Westrick

[11] Patent Number: 6,163,261
[45] Date of Patent: Dec. 19, 2000

[54] WIRELESS PET CONFINEMENT SYSTEM

[75] Inventor: Michael D. Westrick, Fort Wayne, Ind.

[73] Assignee: Innotek Pet Products, Inc., Garrett, Ind.

[21] Appl. No.: 09/324,097

[22] Filed: Jun. 1, 1999

[51] Int. Cl.[7] .......................... G08B 21/00; A01K 15/02
[52] U.S. Cl. ...................... 340/573.3; 119/721; 119/908
[58] Field of Search .................. 340/573.3; 119/721, 119/908

[56] References Cited

U.S. PATENT DOCUMENTS

| | | | |
|---|---|---|---|
| 5,241,923 | 9/1993 | Janning | 119/721 |
| 5,381,129 | 1/1995 | Boardman | 340/573.3 |
| 5,589,821 | 12/1996 | Sallen et al. | 340/573.4 |
| 5,606,936 | 3/1997 | Davis | 119/721 |
| 5,642,690 | 7/1997 | Calabrese et al. | 119/721 |
| 5,708,421 | 1/1998 | Boyd | 340/573.1 |
| 5,794,569 | 8/1998 | Titus et al. | 119/721 |
| 5,852,403 | 12/1998 | Boardman | 340/573.3 |
| 5,872,516 | 2/1999 | Bonge, Jr. | 340/573.3 |
| 5,963,130 | 10/1999 | Schlager et al. | 340/540 |

*Primary Examiner*—Glen Swann
*Attorney, Agent, or Firm*—Taylor & Aust, P.C.

[57] ABSTRACT

A method of applying at least one of a stimulus and a warning signal to an animal includes selecting a maximum desired distance between the animal and a transmitter, transmitting a radio frequency signal from the transmitter at a first point in time, and receiving the radio frequency signal with a receiver attached to the animal. An ultrasonic frequency signal is transmitted from the transmitter at a second point in time. A first time difference between the second point in time and the first point in time varies inversely with the selected maximum desired distance. The ultrasonic frequency signal is received with the receiver at a third point in time. A second time difference between the third point in time and the first point in time is calculated. It is determined whether the animal is beyond the maximum desired distance from the transmitter by comparing the second time difference with at least one threshold time difference. A stimulus and/or a warning signal is selectively applied to the animal dependent upon the determining step.

20 Claims, 4 Drawing Sheets

WIRELESS PET CONFINEMENT SYSTEM

BACKGROUND OF THE INVENTION

1. Field of the Invention

The present invention relates to a pet confinement system, and, more particularly to a wireless pet confinement system.

2. Description of the Related Art

Pet confinement systems often include a radio frequency transmitter having a wire loop for transmitting the radio frequency signal. The wire loop antenna roughly defines the boundary in which the animal is to be confined. The animal wears a receiving unit that is attached to its collar. If the animal gets within a predetermined distance of the wire loop antenna, the receiver unit detects the radio frequency signal transmitted from the loop antenna, whereupon a correcting stimulus such as an electrical shock is applied to the animal. A problem is that it is difficult and time consuming to lay the ground loop antenna. If a discontinuity in the wire loop antenna occurs, it is then necessary to locate and repair the discontinuity. Furthermore, once the wire loop antenna is laid into the ground, the boundaries of the animal's confinement area are fixed, and cannot be easily modified.

It is also known to track an article or person by transmitting an ultrasound signal to a receiver unit carried by the article or person. In response to receiving the ultrasound signal, the receiver unit transmits a radio frequency signal back to the transmitter of the ultrasound signal. Since the speed of sound is known, and radio frequency signals travel practically instantaneously at the speed of light, the transmitting unit can calculate how far away from the transmitter the receiving unit is located based upon the time interval between transmitting the ultrasound signal and receiving the radio frequency signal. If that time interval exceeds a predetermined threshold. indicating that the receiving unit is further than a threshold distance away from the transmitting unit, a second radio frequency signal is transmitted from the transmitting unit to the receiving unit. Upon receiving the second radio frequency signal, the receiving unit applies a correcting stimulus to the animal. A problem is that the battery in the receiver unit must be replaced quite often since the receiver unit must transmit a radio frequency signal almost continuously during operation. Another problem is that devices for transmitting and receiving radio frequency signals must be provided on both the transmitter unit and the receiver unit carried by the article or person, thus increasing the complexity and cost of the overall system.

What is needed in the art is an animal confinement system that can be easily set up and relocated if necessary. Moreover, an animal confinement system including a receiver unit with an extended battery life is also needed.

SUMMARY OF THE INVENTION

The present invention provides a wireless animal confinement system in which a receiver unit worn by the animal only receives signals, and does not transmit them, thereby extending the battery life of the receiver unit.

The present invention comprises, in one form thereof, a method of applying at least one of a stimulus and a warning signal to an animal. The method includes selecting a maximum desired distance between the animal and a transmitter, transmitting a radio frequency signal from the transmitter at a first point in time, and receiving the radio frequency signal with a receiver attached to the animal. An ultrasonic frequency signal is transmitted from the transmitter at a second point in time. A first time difference between the second point in time and the first point in time varies inversely with the selected maximum desired distance. The ultrasonic frequency signal is received with the receiver at a third point in time. A second time difference between the third point in time and the first point in time is calculated. It is determined whether the animal is beyond the maximum desired distance from the transmitter by comparing the second time difference with at least one threshold time difference. A stimulus and/or a warning signal is selectively applied to the animal dependent upon the determining step.

An advantage is that since a wire loop antenna is not needed, the system can be more easily set up and relocated if the need arises.

Another advantage of the present invention is that since the receiver unit does not transmit signals to the transmitter or base unit, the batter) life of the receiver unit is extended and the complexity and cost of the overall system is reduced.

Yet another advantage of the present invention is that since the transmitter transmits signals only periodically, and operates with a low duty cycle, low current and low power consumption, the transmitter can be battery powered, such as by a solar battery, thereby allowing the system to be fully portable.

A further advantage is that since the transmitter does not need the hardware required to receive signals, the complexity and cost of the overall system is reduced.

Still another advantage is that the receiver can determine whether the animal is moving toward or away from the transmitter.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figures 1, 2:
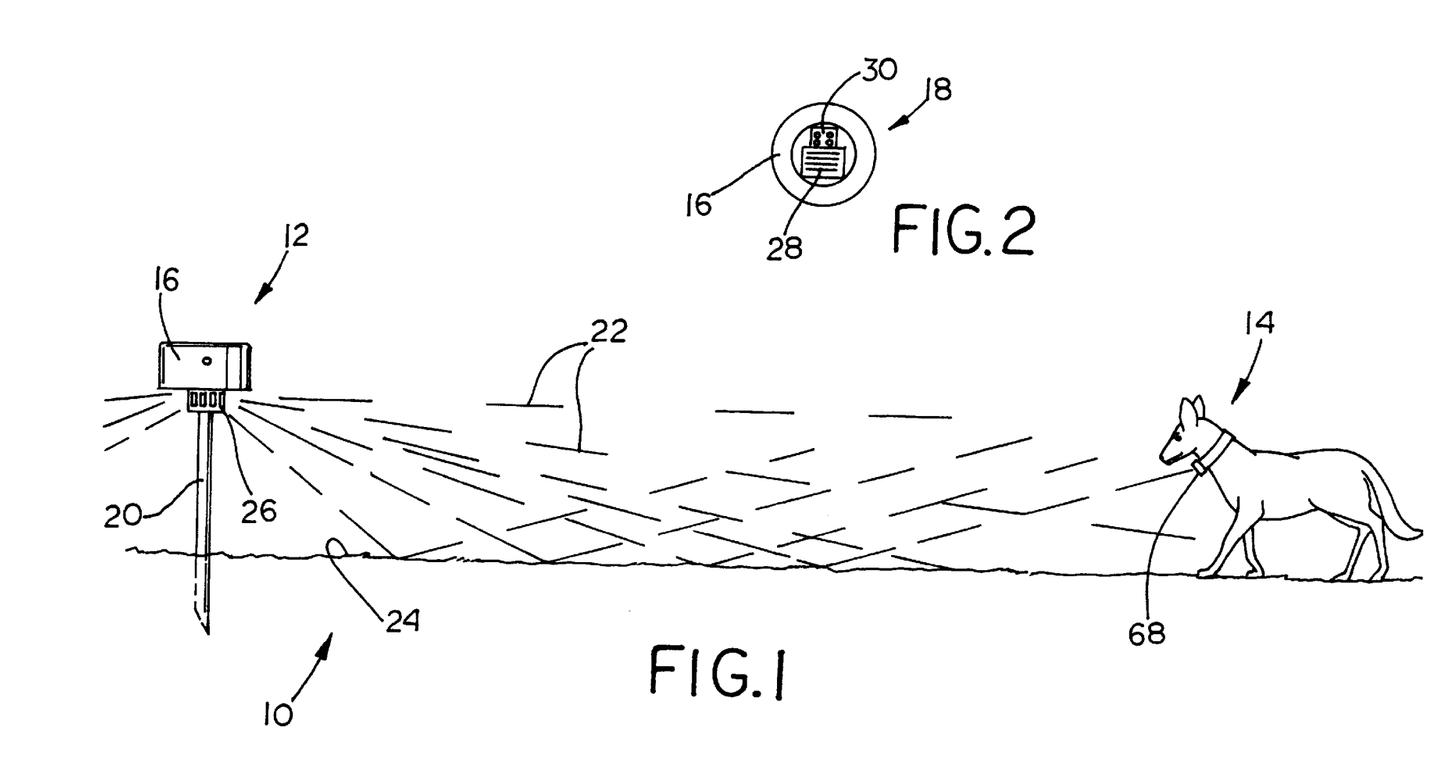
FIG. 1 is a perspective view of one embodiment of the wireless pet confinement system of the present invention.
FIG. 2 is a top view of the transmitter assembly of FIG. 1.

Referring now to the drawings and particularly to FIG. 1, a wireless pet confinement system 10 of the present invention includes a transmitter assembly 12 and a receiver assembly 14 shown attached to the collar of a dog.

Transmitter assembly 12 includes a transmitter device 16 having a solar battery 18 (FIG. 2) and being mounted on a substantially vertical post 20. Transmitter device 16 emits omnidirectional signals, as indicated at 22, which may be reflected off of ground surface 24. Omnidirectional signals 22 include both radio frequency signals and ultrasonic frequency signals. It is to be understood that where the term "ultrasonic" is used herein, it is intended to include the meaning of the word "sonic". Transmitter assembly 12 includes a digital display 26, which may be a liquid crystal display or other similar digital readout, for displaying information, as described in more detail below.

Solar battery 18 includes a solar cell 28 connected to a storage battery 30. Solar battery 18 is capable of sourcing enough power to allow transmitter assembly 12 to operate indefinitely.

Figure 3:
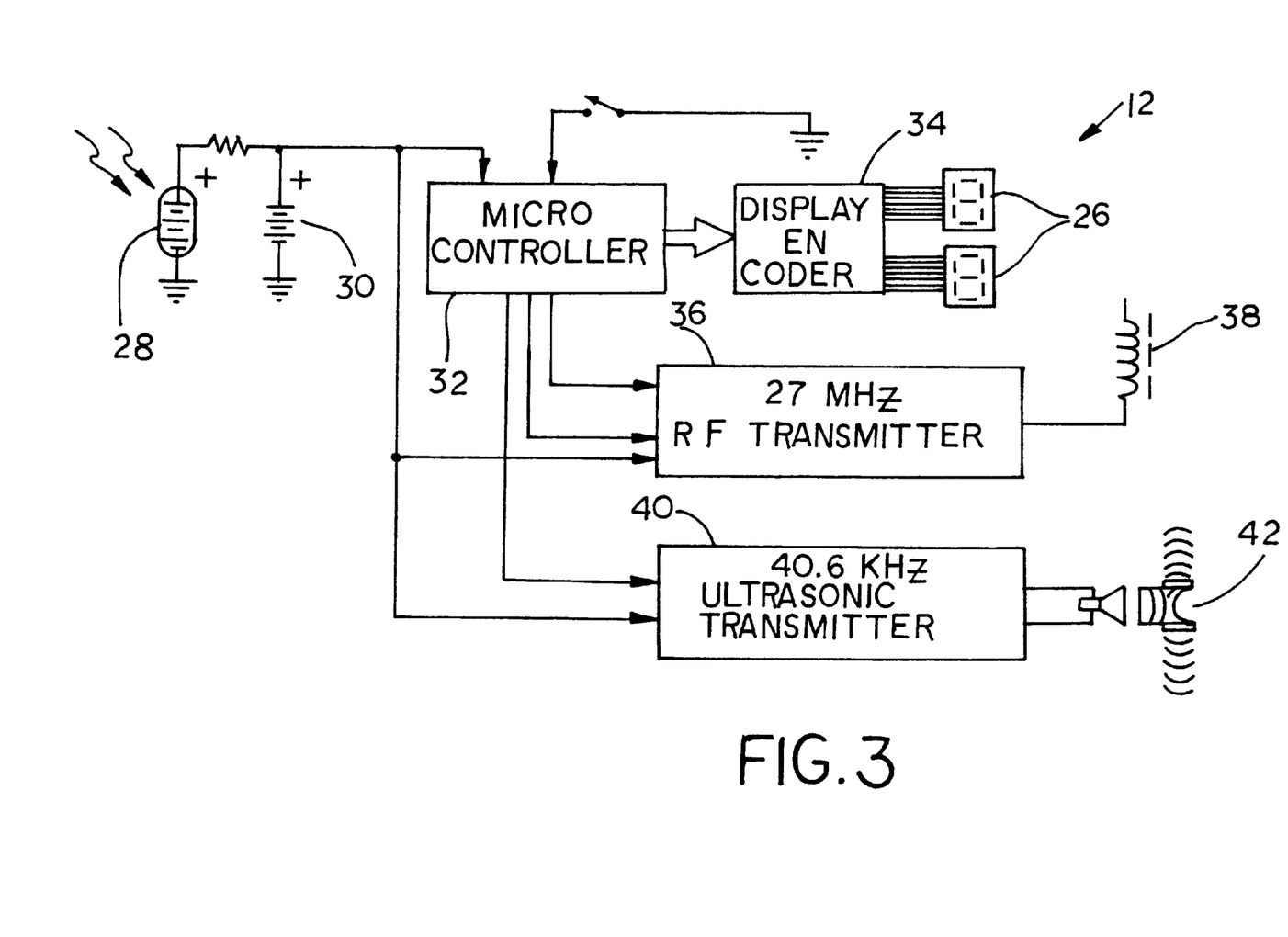
FIG. 3 is a schematic diagram of the transmitter device of FIG. 1.

Transmitter device 16 includes a microcontroller 32 (FIG. 3) which controls display 26 through a display encoder 34. Microcontroller 32 also controls a transmitter 36 which emits radio frequency signals through ferrite antenna 38. Lastly, microcontroller 32 controls ultrasonic transmitter 40 in order to cause an omnidirectional ultrasonic signal to be emitted from omnidirectional disburser or transducer 42. The radio frequency signal emitted by antenna 38 of transmitter assembly 12 is received by ferrite antenna 44 (FIG. 4) on receiver assembly 14. Receiver 46 processes radio frequency signals received by antenna 44 that are near the frequency of the radio frequency signals produced by transmitter 36, which can be approximately 27 MHz. Receiver 46 then sends a signal to microcontroller 48 on data line 50 indicating that a radio frequency signal of the frequency of interest has been received. Omnidirectional disburser or transducer 52 of receiver assembly 14 receives the ultrasonic signal emitted by transmitter 40. Then, heterodyne narrow band ultrasonic receiver 54 transmits a signal on data line 56 indicating to microcontroller 48 that an ultrasonic signal within the narrow band of receiver 54 has been received. This narrow band can include the frequency of 40.6 KHz.

Figure 4:
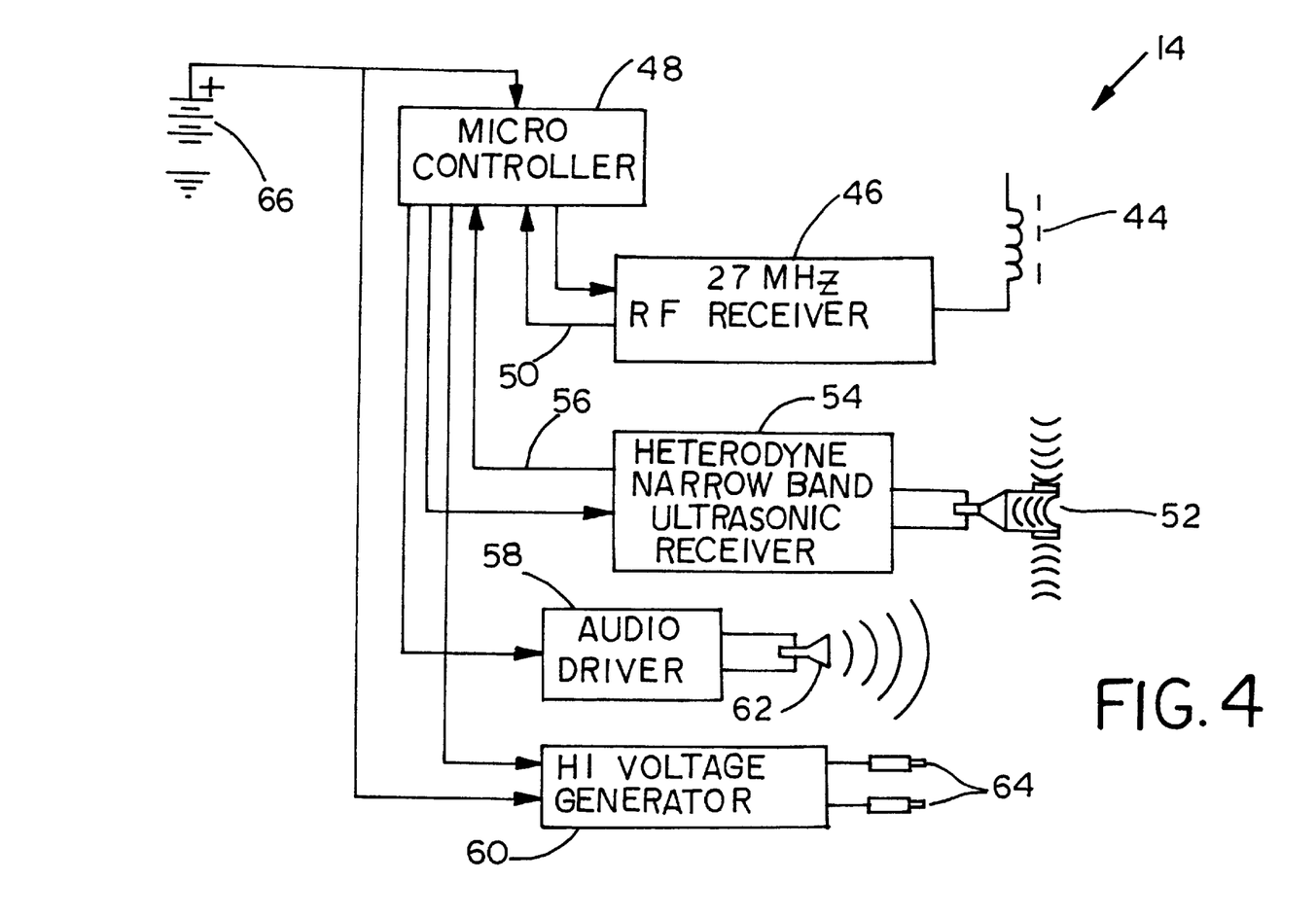
FIG. 4 is a schematic diagram of the receiver of FIG. 1.

Microcontroller 48 selectively turns on an audio driver 58 and/or a high voltage generate 60 dependent upon the time interval between signals received from radio frequency receiver 46 and from ultrasonic receiver 54 as described in more detail below. Audio driver 58 drives a speaker 62 which emits an audible warning signal to the animal. High voltage generator 60 produces a voltage difference between probes 64 in order to apply an electrical stimulus to the animal when probes 64 are in contact with the animal's body. As is well known, receiver assembly 14 can be attached to the dog's collar such that probes 64 are pressed or biased against the dogs fur and/or skin. Microcontroller 48, audio driver 58 and high voltage generator 60 are all powered by battery 66, which may be a replaceable lithium battery with a capacity of 920 milliamp hours.

In operation, transmitter device 16 first sends a coded 27 megahertz reference radio signal followed by a 40.6 kilohertz 10 millisecond wide ultrasonic range determination pulse. These signals are sent every 0.25 second, which is the response latency of the system. Both signals are approximately omnidirectional.

Figure 5:
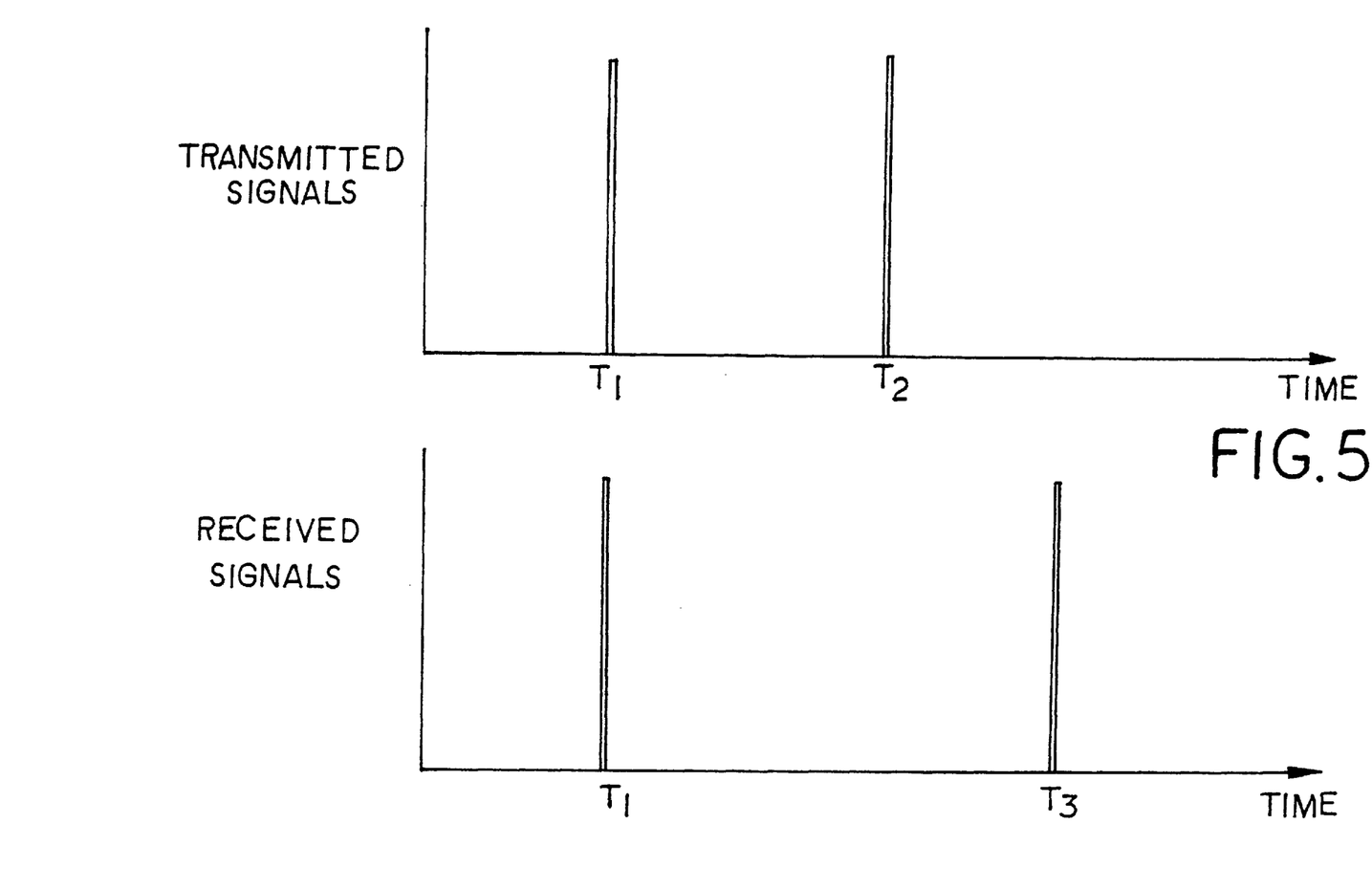
FIG. 5 is a timing diagram of signals transmitted by the transmitter device of FIG. 1 and received by the receiver of FIG. 1.

Transmitter 36 emits a four burst per second coded reference signal at time $T_1$ (FIG. 5) which serves to qualify validity and start a range timer within microcontroller 48 and receiver assembly 14. The radio reference signal travels approximately at the speed of light (180,000 meters pers second), and arrives instantly, for all practical purposes, at time $T_1$ at receiver assembly 14, as indicated in FIG. 5. An ultrasonic pulse is sent at time $T_2$ from ultrasonic transmitter 40 and arrives at ultrasonic receiver 54 at time $T_3$. Since the speed of sound in air is approximately 1 millisecond per foot, the time interval between $T_3$ and $T_2$ is approximately 1 millisecond for each foot of distance between transmitter assembly 12 and receiver assembly 14.

When receiver assembly 14 receives the radio frequency signal at time $T_1$, an internal clock within microcontroller 48 is activated. If the time interval $(T_2-T_1)$ between transmission: of the ultrasonic frequency signal and the radio frequency signal is stored in microcontroller 48 before the transmission of these signals, microcontroller 48 can easily determine the time interval $(T_3-T_2)$ as the difference between the time interval $(T_3-T_1)$ and the preprogrammed time interval $(T_2-T_1)$. From the calculation of the time interval $(T_3-T_2)$, microcontroller 48 can calculate the distance between transmitter assembly 12 and receiver assembly 14. If this distance exceeds a first threshold, microcontroller 48 can cause speaker 62 to emit an audible warning to the dog. If the distance between receiver assembly 14 and transmitter assembly 12 exceeds a second, higher threshold distance, micro-processor 48 can cause probes 64 to apply a stimulus to the dog in the form of an electrical shock.

The velocity of the ultrasonic signal through the air is very consistent, with less than 5% variation over temperature, barometric pressure and humidity extremes. Thus, the measured transmission time of the ultrasonic signal is an accurate indication of the distance of receiver assembly 14 from transmitter assembly 12.

The coded, radio frequency reference signal contains an electronic identification of the system so that potential adjacent systems do not interfere. The radio frequency reference signal is approximately 8 milliseconds in length using an FM manchester code format.

In a preferred embodiment, a user can set the first threshold distance and/or the second threshold distance, at which the animal receives an audible warning signal and an electrical stimulus, respectively. Digital display 26 can be used to display the current setting of the first threshold distance and/or the second threshold distance.

The time delay $(T_2-T_1)$ between the transmission of the radio frequency signal and the transmission of the ultrasonic frequency signal is variable and is a function of the threshold setting that is displayed on display 26. More particularly, the time delay $(T_2-T_1)$ varies inversely with the threshold distance such that the threshold time delay $(T_3-T_1)$ between reception of the radio frequency signal and the ultrasonic frequency signal is substantially constant and does not vary with the threshold distance set at transmitter assembly 12. Thus, no modification is required for receiver assembly 14 when an adjustment of the threshold distance is made at transmitter assembly 12.

For example, assuming that the speed of propagation of the ultrasonic signal is 1 millisecond per foot, if the range setting is 5 feet and the delay $(T_2-T_1)$ is 55 milliseconds, then receiver assembly 14 determines whether the delay $(T_3-T_1)$ between reception of the radio frequency signal and reception of the ultrasonic frequency signal is greater than 60 milliseconds. If the delay $(T_3-T_1)$ is less than 60 milliseconds, microcontroller 48 determines that the animal is less than 5 feet from transmitter assembly 12, and microcontroller 48 takes no corrective action. However, if the time delay $(T_3-T_1)$ is greater than 60 milliseconds, then microcontroller 48 determines that the distance between the animal and transmitter assembly 12 is greater than 5 feet, and receiver assembly 14 then emits an audible warning and/or applies an electrical stimulus to the animal.

If the range setting is changed to 50 feet, microcontroller 32 changes the time delay $(T_2-T_1)$ between transmissions of the radio frequency and ultrasonic frequency signals to 10 milliseconds. Thus, receiver assembly 14 still only needs to determine whether the time delay ($T_3-T_1$) is greater than 60 milliseconds. If so, then it is determined that the animal is beyond the range allowed by transmitter assembly 12, and a corrective audible signal and/or electrical stimulus is applied to the animal. Thus, microcontroller 48 can determine that the threshold distance is exceeded, although microcontroller 48 does not know at what value the threshold distance is set by transmitter assembly 12. By the above described method of transmitting the ultrasonic distance control signal a variable time later than the reference radio signal, the upper limit of the allowable distance between the animal and transmitter assembly 12 can be varied. Receiver assembly 14 determines whether the time delay ($T_3-T_1$) is greater than 60 milliseconds, regardless of the range setting.

In order to conserve power, transmitter assembly 12 sends an 8 millisecond reference radio signal and a 10 millisecond ultrasonic ranging signal once every 250 milliseconds. The ultrasonic signal travels approximately 250 feet during this time period. Thus, this time between signals of 250 milliseconds is long enough for any echos from the ultrasonic signal to dissipate and not cause any interference. Both the reference radio signal and ranging ultrasonic signal use about 1 milliamp of current peak with the resulting average transmit current being approximately 100 microamps. With microprocessor 32 using an additional 150 microamps, solar battery 18 runs indefinitely.

Receiver assembly 14 uses the 920 milliamp-hour replaceable lithium battery 66 as its power source. Ultrasonic receiver 54 uses a micropower 40 kilohertz current starved CMOS invertor amplifier, with a micropower MOSFET mixer to provide a 500 hertz intermediate frequency (IF) center frequency. The IF uses a micropower active filter op amp to provide the 100 hertz final bandwidth for optimum sensitivity and interference rejection. Total quiescent current for ultrasonic receiver 54 is approximately 35 microamps. The 27 megahertz reference receiver 46 utilizes the Innotek "Time Slice" architecture for power conservation. When receiver 46 is initially synchronized to transmitter 36, receiver 46 is powered continuously for the first 250 milliseconds to acquire the first reference signal. Once acquired, receiver 46 is powered up only once every 250 milliseconds to re-synchronize the anticipated reference radio signal. If the reference signal were lost for any reason, receiver 46 stays on to re-acquire it. With a peak current draw of 3 milliamps, the average reference receiver current is 130 microamps. Since microcontroller 48 uses the 40 kilohertz Local Oscillator clock, microcontroller current drain is only 17 microamps, with total quiescent current being 182 microamps. This yields approximately 90 days of operation for receiver assembly 14.

The confinement system 10 operates in a fail safe manner to ensure that unwarranted corrective signals are not applied to the animal. System 10 uses common transmission paths and reception paths for the reference radio and modulated control signals to ensure that if a hardware failure occurs, both signals are lost, and no false shock signal can be discerned with an uncorrelated ultrasonic pulse reception. Such uncorrelated ultrasonic pulse reception may be from a high amplitude broad band impulse, i.e., from banging of metal dog tags, leash, etc., and will resonate at a constant frequency, which may be in the range of 40–41 kilohertz. A time based de-fruiting or filtering algorithm allows very tight windowing for anticipated ultrasonic receive pulses, and ensures that the uncorrelated ultrasonic pulse reception is not regarded as an ultrasonic signal emitted by transmitter assembly 12. More particularly, the frequency of the ultrasonic signal from transmitter device 16 is slewed at a constant rate over the 10 millisecond duration of the signal in order to distinguish the signal from an uncorrelated pulse that resonates at a constant frequency. For example, the frequency of the transmitted ultrasonic frequency signal can be ramped from 40.585 kilohertz to 40.615 kilohertz over the course of the 10 millisecond duration of the signal. Microcontroller 48 can then identify the received ultrasonic signal as having originated from transmitter device 16 by virtue of having this slewed or ramped frequency.

Two successive decodes with similar range values is also required for correlation and subsequent audio warning/correction.

A difference in the frequency of successively received ultrasonic signals (250 milliseconds apart) may be caused by a Doppler shift when the animal is moving towards or away from transmitter assembly 12. Microprocessor 48 can inhibit or modify the amplitude of a shock stimulus or warning tone depending upon the value of this Doppler shift. For instance, if the Doppler shift indicates that the animal is moving or accelerating out of the confinement area, then the amplitude of the shock stimulus may be increased. Conversely if the Doppler shift indicates that the animal is moving back towards the confinement areas then the amplitude of the audible warning tone and/or the shock stimulus may be decreased.

The ultrasonic transducers in both transmitter assembly 12 and receiver assembly 14 are protected against environmental hazards related to outdoor use. Transmitter assembly 12 includes a horizontally or downwardly facing transducer that has an omnidirectional discone/dispersion element. The balance of transmitter device 16 is protected by potting the entire electronics section. Receiver assembly 14 has one or two transducers that are located in the sides or bottom of case or housing 68 of receiver assembly 14. These transducers are durable and can be soaked. The balance of the electronics of receiver assembly 14 is potted to ensure high reliability.

In the embodiments shown, the radio frequency signal is transmitted before the ultrasonic frequency signal. However, it is to be understood that the ultrasonic signal can also be transmitted before or simultaneously with the radio signal.

Although having a constant threshold for the time delay ($T_3-T_1$) regardless of the range setting at transmitter assembly 12 minimizes the computations that must be performed by microcontroller 48, it is also possible for the threshold time delay ($T_3-T_1$) to vary with the range setting. For example, the time delay between transmissions of the radio and ultrasonic signals ($T_2-T_1$) can be kept constant. At least one of these two signals can then carry information which informs receiver assembly 14 of the current setting of the threshold distance. Microcontroller 48, having been preprogrammed with the constant time delay ($T_2-T_1$), can then calculate the threshold time delay ($T_3-T_1$) based upon the range setting included in the received signals.

Transmitter assembly 12 has been described as transmitting a radio frequency signal and an ultrasonic or sonic frequency signal. However, it is to be understood that the method of the present invention can be carried out with a radio frequency signal and any other type of signal which propagates through air at substantially less than the speed of light.

The stimulus applied to the animal has been described herein as an electrical shock. However, it is to be understood that the stimulus can also be any other type of unpleasant sensation or irritant, such as an audible tone, a smell, a spray, or a sensation caused by a mechanical device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of applying at least one of a stimulus and a warning signal to an animal, said method comprising the steps of:
    selecting a distance value between the animal and a transmitter;
    transmitting a radio frequency signal from said transmitter at a first point in time;
    receiving, at a time substantially equal to said first point in time, said radio frequency signal with a receiver attached to the animal;
    transmitting an ultrasonic frequency signal from said transmitter at a second point in time, a first time difference between said second point in time and said first point in time varying inversely with said selected distance value;
    receiving said ultrasonic frequency signal with said receiver at a third point in time;
    calculating a second time difference between said third point in time and said first point in time;
    determining whether the animal is beyond the distance value from said transmitter by comparing said second time difference with at least one threshold time difference; and
    selectively applying said at least one of a stimulus and a warning signal to the animal dependent upon said determining step.

2. The method of claim 1, comprising the further step of establishing said first time difference by subtracting an expected propagation time from said threshold time difference, wherein said expected propagation time is defined as a time required for said ultrasonic frequency signal to travel said distance value.

3. The method of claim 1, wherein said threshold time difference is constant and is independent of said selected distance value.

4. The method of claim 1, wherein said at least one threshold time difference comprises at least a first threshold time difference and a second threshold time difference, said selectively applying step including applying the warning signal to the animal if said second time difference exceeds said first threshold time difference, and applying the stimulus to the animal if said second time difference exceeds said second threshold time difference.

5. The method of claim 1, wherein each of said radio frequency signal and said ultrasonic frequency signal are substantially omnidirectional.

6. The method of claim 5, comprising the further steps of:
    attaching said transmitter to an upper end of a substantially vertical elongate element; and
    mounting a lower end of said elongate element into a ground surface.

7. The method of claim 6, comprising the further step of providing said transmitter with a substantially horizontally facing disperser.

8. The method of claim 6, wherein said transmitting steps include reflecting at least one of said radio frequency signal and said ultrasonic frequency signal off of the ground surface toward said receiver.

9. The method of claim 8, comprising the further steps of:
    providing said transmitter with a downward facing disperser; and
    providing said receiver with:
        a housing; and
        at least one disperser disposed in at least one of A side and a bottom of said housing.

10. The method of claim 1, wherein said radio frequency signal includes an identification code corresponding to said transmitter.

11. The method of claim 1, wherein a frequency of said ultrasonic frequency signal is ramped from a first frequency value at a beginning of said ultrasonic frequency signal to a second frequency value at an end of said ultrasonic frequency signal, said step of receiving said ultrasonic frequency signal including recognizing said ramping of said frequency of said ultrasonic frequency signal to thereby identify said ultrasonic frequency signal.

12. The method of claim 1, wherein each said transmitting step is cyclically repeated.

13. The method of claim 12, comprising the further steps of:
    comparing frequencies of successively sent ultrasonic frequency signals in order to determine a direction of movement of the animal; and
    modifying an intensity of at least one of said stimulus and said warning signal dependent upon said direction of movement of the animal.

14. The method of claim 12, wherein two consecutive said second time differences must exceed said threshold time difference before one of said stimulus and said warning signal is applied to the animal.

15. The method of claim 1, comprising the further step of providing said receiver with a solar battery including a solar cell.

16. The method of claim 1, wherein said selected distance value comprises a maximum desired distance.

17. A method of applying at least one of a stimulus and a warning signal to an animal, said method comprising the steps of:
    transmitting a radio frequency signal from a transmitter at a first point in time;
    receiving, at a time substantially equal to said first point in time, said radio frequency signal with a receiver attached to the animal;
    transmitting one of an ultrasonic frequency signal and a sonic frequency signal from said transmitter at a second point in time;
    receiving said one of an ultrasonic frequency signal and a sonic frequency signal with said receiver at a third point in time;
    calculating a first time difference between said third point in time and said first point in time;
    comparing said first time difference with a threshold time difference; and
    selectively applying said at least one of a stimulus and a warning signal to the animal dependent upon said comparing step.

18. A method of modifying behavior of an animal, said method comprising the steps of:
    transmitting one of a radio frequency signal and an ultrasonic frequency signal from a transmitter;

receiving, at a first point in time, said one of a radio frequency signal and an ultrasonic frequency signal with a receiver attached to the animal;

transmitting an other of said radio frequency signal and said ultrasonic frequency signal from said transmitter;

receiving said other of said radio frequency signal and said ultrasonic frequency signal with said receiver at a second point in time;

calculating with said receiver a time difference between said second point in time and said first point in time;

dependent upon said time difference, one of:
   emitting a warning signal;
   applying a stimulus to the animal; and
   taking no action towards the animal.

19. An apparatus for modifying the behavior of an animal, said apparatus comprising:

a transmitter configured for transmitting a radio frequency signal and an ultrasonic frequency signal; and a receiver configured for being attached to the animal and receiving said radio frequency signal and said ultrasonic frequency signal from said transmitter, said receiver including means for calculating a time difference between receipt of said radio frequency signal and receipt of said ultrasonic frequency signal to thereby determine a distance between said transmitter and said receiver.

20. The apparatus of claim 19, wherein said receiver includes means for selectively applying at least one of a stimulus and a warning signal to the animal dependent upon said determined distance between said transmitter and said receiver.

* * * * *

UNITED STATES PATENT AND TRADEMARK OFFICE
CERTIFICATE OF CORRECTION

PATENT NO.   : 6,163,261
DATED        : December 19, 2000
INVENTOR(S)  : Michael D. Westrick It is certified that error appears in the above-indentified patent and that said Letters Patent is hereby corrected as shown below:

Column 2
Line 16, delete "bater)" and substitute --battery therefor.

Column 3
Line 40, after 54 insert --,-- therefor.

Column 4
Line 6, delete "transmission:" and substitute --transmissions-- therefor.

Column 6
line 23, after conversely insert --,-- therefor.
line 25, delete "areas" and substitute --area,-- therefor.

Column 8
Line 10, delete "A" and substitute --a-- therefor.

Signed and Sealed this

Twenty-ninth Day of May, 2001

Attest:

NICHOLAS P. GODICI

Attesting Officer    Acting Director of the United States Patent and Trademark Office